US010395527B2

(12) United States Patent
Hofsaess et al.

(10) Patent No.: US 10,395,527 B2
(45) Date of Patent: Aug. 27, 2019

(54) METHOD AND CONTROL AND DETECTION DEVICE FOR A PLAUSIBILITY CHECK OF A WRONG-WAY DRIVING INCIDENT OF A MOTOR VEHICLE

(71) Applicant: Robert Bosch GmbH, Stuttgart (DE)

(72) Inventors: Volker Hofsaess, Moeglingen (DE); Martin Rous, Mundelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 83 days.

(21) Appl. No.: 14/916,616

(22) PCT Filed: Sep. 1, 2014

(86) PCT No.: PCT/EP2014/068465
§ 371 (c)(1),
(2) Date: Mar. 4, 2016

(87) PCT Pub. No.: WO2015/032707
PCT Pub. Date: Mar. 12, 2015

(65) Prior Publication Data

US 2016/0225256 A1 Aug. 4, 2016

(30) Foreign Application Priority Data

| | | |
|---|---|---|
| Sep. 6, 2013 | (DE) | 10 2013 217 833 |
| Nov. 15, 2013 | (DE) | 10 2013 223 403 |
| May 8, 2014 | (DE) | 10 2014 208 662 |

(51) Int. Cl.
*G08G 1/056* (2006.01)
*G08G 1/0962* (2006.01)
(Continued)

(52) U.S. Cl.
CPC ......... *G08G 1/056* (2013.01); *G08G 1/09623* (2013.01); *G08G 1/166* (2013.01); *G06K 9/00798* (2013.01); *G06K 9/00818* (2013.01)

(58) Field of Classification Search
CPC .... G08G 1/056; G08G 1/09623; G08G 1/166; G06K 9/00798; G06K 9/00818
(Continued)

(56) References Cited

U.S. PATENT DOCUMENTS

| | | | |
|---|---|---|---|
| 3,559,756 | A | 2/1971 | Torres |
| 2003/0216858 | A1 | 11/2003 | Sakai |

(Continued)

FOREIGN PATENT DOCUMENTS

| | | |
|---|---|---|
| DE | 102 19 904 | 4/2004 |
| DE | 10 2007 048842 | 9/2008 |

(Continued)

*Primary Examiner* — Redhwan K Mawari
*Assistant Examiner* — Rodney P King
(74) *Attorney, Agent, or Firm* — Norton Rose Fulbright US LLP; Gerard Messina

(57) ABSTRACT

A method and a control and detection device for a plausibility check of a wrong-way driving incident of a motor vehicle at a junction of a unidirectional roadway of a road, in which the plausibility check is activated by recognizing a direction feature of a roadway of the junction, and in which it is determined whether a current driving direction of the motor vehicle leads in the direction of a roadway having at least one prohibition sign, indicating that entry is prohibited, and/or in which it is determined whether a predicated driving route of the motor vehicle leads in the direction of a roadway having at least one prohibition sign.

12 Claims, 3 Drawing Sheets

(51) Int. Cl.
*G08G 1/16* (2006.01)
*G06K 9/00* (2006.01)

(58) Field of Classification Search
USPC .......................................................... 701/532
See application file for complete search history.

(56) References Cited

U.S. PATENT DOCUMENTS

| | | | | |
|---|---|---|---|---|
| 2004/0267452 | A1* | 12/2004 | Igarashi | G01S 7/22 701/300 |
| 2007/0150183 | A1 | 6/2007 | Tolmei | |
| 2007/0263901 | A1 | 11/2007 | Wu et al. | |
| 2012/0259507 | A1 | 10/2012 | Fink | |

FOREIGN PATENT DOCUMENTS

| | | | |
|---|---|---|---|
| DE | 10 2010 052129 | | 6/2012 |
| EP | 1 327 968 | | 7/2003 |
| EP | 1 840 860 | | 10/2007 |
| EP | 2 164 057 | | 3/2010 |
| JP | 2001199257 | A | 7/2001 |
| JP | 2002274215 | A | 9/2002 |
| JP | 2008181328 | A | 8/2008 |

* cited by examiner

METHOD AND CONTROL AND DETECTION DEVICE FOR A PLAUSIBILITY CHECK OF A WRONG-WAY DRIVING INCIDENT OF A MOTOR VEHICLE

FIELD OF THE INVENTION

The present invention relates to a method and a control and detection device for a plausibility check of a wrong-way driving incident of a motor vehicle at a junction of a unidirectional roadway of a road or expressway.

BACKGROUND INFORMATION

Wrong-way drivers, also referred to as "ghost drivers," cause deaths, injuries, and significant property damage in the event of an accident. A wrong-way driving incident is understood here to mean driving against the compulsory direction of traffic on a unidirectional roadway. A unidirectional roadway is a roadway that is structurally separated from oncoming traffic. Unidirectional roadways are found on expressways or thruways, such as upgraded federal highways. Wrong-way driving incidents may be divided into forward travel and reverse travel, forward travel being initiated by wrongly entering an off-ramp or by turning.

Over one-half of wrong-way driving incidents start at junctions of expressways. In particular, wrong-way driving incidents on expressways cause accidents due to the high vehicle speeds, and thus the high collision speeds, frequently with fatal consequences.

Recognizing wrong-way driving incidents via navigation devices is not always reliably possible, since the information of the navigation device, such as road class and direction, is provided too late for most cases of wrong-way driving incidents; i.e., the vehicles are then already in the driving path against the direction of traffic.

Modern motor vehicles use inertial sensors, such as acceleration sensors and yaw rate sensors, as well as the steering angle for determining the state of the vehicle, in order to implement safety and comfort systems. Furthermore, a large number of modern vehicles currently have an internal GPS module, for example, for a navigation system or for a position determination of the motor vehicle. More and more vehicles are already equipped and will be equipped in the future with video sensor systems.

SUMMARY OF THE INVENTION

The method according to the present invention for a plausibility check of a wrong-way driving incident of a motor vehicle at a junction of a unidirectional roadway of a road includes, in principle, the following steps:

- activating the plausibility check by recognizing a direction feature of a roadway of the junction;
- determining whether a current driving direction of the motor vehicle leads in the direction of a roadway having at least one prohibition sign indicating that entry is prohibited; and/or
- determining whether a predicated driving route of the motor vehicle leads in the direction of a roadway having at least one prohibition sign.

The present method specifically targets the wrong-way driving behavior of a motor vehicle or that of a driver at an on-ramp or at a junction, since it is there that most wrong-way driving incidents occur. Thus, the wrong-way driving incident may advantageously be checked for plausibility and/or detected according to the present invention already before entry onto the actual road or unidirectional roadway.

The method according to the present invention very advantageously enables the detection of an event chain, which enables a plausibility check, i.e., checking or prechecking, as preparation or component of a detection or recognition of a wrong-way driving incident. The method according to the present invention may also already be considered and used as detection of a wrong-way driving incident. Safety is achieved by the recording of surroundings data, the prediction of the roadway or of the driving route and/or steering intention, which enhances the reliability and robustness of the method. In this way, the present invention may safely recognize unintentional wrong-way driving incidents and enhance the overall traffic safety. The plausibility check permits a significantly improved false-positive rate.

With the aid of a direction feature such as, for example, a direction sign or prohibition sign, it is possible to recognize a roadway ahead of the vehicle which the vehicle is not allowed to enter. The roadway in this case may be identified directly by its own direction feature or indirectly by a direction feature of another roadway. In this way, the mere possibility of an instance of wrong-way driving is initially determined and, as a result, the rest of the method is activated. In this way, it is possible to suppress false warnings during normal driving, which enhances the safety and acceptance of the users. Subsequently, it is determined whether the current driving direction and/or a predicated driving route could result in a wrong-way driving incident. Thus, an incremental plausibility check of a wrong-way driving incident already takes place in advance, thereby enhancing safety.

The current driving direction may be defined, for example, by an extended longitudinal axis of the vehicle, a vertical to a front side or front of the motor vehicle or by a parallel relative to the non-steered wheels of the vehicle, or by a vertical to the connecting line of both wheels. The current driving direction is, to an extent, a static view, originating from the instantaneous or current position of the vehicle. The predicated driving route or trajectory, on the other hand, may be considered a dynamic view and may be predicted or calculated, for example, from the driving direction and a steering angle, or may be based on speed, steering angle, inertial sensor data or GPS (Global Positioning System) data.

In one particular specific embodiment, it is determined whether the current driving direction of the motor vehicle runs between two prohibition signs situated to the left and to the right of the roadway; and/or whether the predicated driving route of the motor vehicle runs between two prohibition signs situated to the left and to the right of the roadway. The accuracy and reliability of the method are increased due to double the amount of information and to the possibility of tracking a visual flow between the two signs in the image data. According to the visual flow, the coordinates of the left prohibition sign move toward the left during travel toward the sign, whereas the coordinates of the right prohibition sign move to the right, which is easy to determine or to detect.

The determination or detection may advantageously include a check whether the current driving direction and/or the predicated driving route intersects a connecting line of the two prohibition signs. This enables an image processing to be carried out simply and rapidly, which enhances the robustness of the method.

According to one specific embodiment of the present invention, it is provided that at least one sensor of the motor vehicle, which may be a visual sensor, such as a video camera, is used for the activation and/or determination. Since, in the meantime, various sensors are installed in most motor vehicles, these or their signals may be easily used for the method. The signals may be used directly or indirectly, for example, processed or as a basis for derived variables or values. Sensors used may be, for example, image sensors, including cameras or video cameras, radar sensors, acceleration sensors, wheel sensors, steering angle sensors, GPS devices, but also navigation devices or processor units or control units processing these or other data. The use of two sensor types such as, for example, a video sensor system and a navigation module is particularly advantageous, since the two types complement one another. This enhances the safety and robustness of the method.

For the activation, it may be detected whether the motor vehicle is situated on an oncoming lane. This relatively rapidly detectable criterion may be used either additionally for the plausibility check or as a start criterion for the plausibility check. It is possible either way to enhance the safety and reliability of the method. This criterion may be detected with the aid of a sensor system such as, for example, a video sensor system or a navigation device or navigation module.

It is advantageously provided that the direction feature of the roadway is a road sign. Since the additional method steps also recognize road signs, the use of a road sign in this case as a direction feature is also advantageous; alternatively, roadway markings and/or road boundaries may also be used. A no-entry sign used later may particularly advantageously also be provided as a direction feature of the roadway.

It is also possible for the prohibition sign or signs to be illuminated with light from the motor vehicle and the reflection be used in the step or the steps of determining. The illumination with light, for example, by a turn signal, a high beam or with encoded light signals also by spot beams, for example, may be used for a further plausibility check. The illuminating or lighting may improve the recognition of the prohibition sign, particularly in darkness or in poor weather conditions.

In addition, after passing the prohibition sign, an exit sign directed opposite to the current driving direction may be detected. After passing the prohibition sign or after passing through a corresponding pair of signs, the motor vehicle is situated on a wrong roadway or even already on a wrong unidirectional roadway. A wrong-way driving incident may then already be determined. Alternatively or in addition, it is possible to continue the plausibility check by recognizing or detecting an exit sign, which is then installed for the oncoming traffic of the wrong-way driver. For example, a directional indication of the exit sign, such as an arrow on the sign or the sign in the shape of an arrow directed opposite to the current driving direction of the wrong-way driver, may be used for a further plausibility check of a wrong-way driving incident.

After passing the prohibition sign, a median strip of the road may be advantageously detected to the right of the current driving direction and/or the predicated driving route. As described above, the motor vehicle is now driving the wrong way. Alternatively or in addition, it is possible to continue the plausibility check by recognizing or detecting a median strip on the right or passenger side (for right-hand traffic). The median strip may, for example, be a concrete wall.

It is advantageously provided that each determination and/or detection includes a plausibility check criterion and each plausibility check criterion being assigned a percentage for ascertaining the probability of a wrong-way driving incident. By simply adding the percentages together, which may be provided independently of one another or conditionally weighted, it is then possible to rapidly and reliably determine the probability of a wrong-way driving incident. In this way, the robustness and reliability of the method and, therefore, the safety of the vehicle and occupants may be enhanced.

According to the present invention, a control and detection device is provided for a plausibility check of a wrong-way driving incident of a motor vehicle at a junction of a unidirectional roadway or a road, including an arrangement for activating the plausibility check, configured for recognizing a direction feature of a roadway at the junction, and an arrangement for determining whether a current driving direction of the motor vehicle leads in the direction of a roadway having at least one prohibition sign indicating no entry and/or an arrangement for determining whether a predicated driving route of the motor vehicle leads in the direction of a roadway having at least one prohibition sign. The same advantages and modifications as those described above apply.

The arrangement for activating may include an image sensor, such as a camera for individual images or a video camera for film sequences, which is able to easily recognize the signs and the movement of the signs relative to the vehicle, as well as the movement of objects, such as one or multiple signs in the image, also referred to as visual flow, and may therefore provide a solid foundation for the method. The arrangement for determining may include a controller or control device or a suitable processor unit.

The steps of determining or detecting, and the plausibility check criteria include the group: determining whether a current driving direction of the motor vehicle leads in the direction of a roadway having at least one prohibition sign; determining whether a predicated driving route of the motor vehicle leads in the direction of a roadway having at least one prohibition sign; determining whether the current driving direction of the motor vehicle runs between two prohibition signs situated to the left and to the right of the roadway; determining whether the predicated driving route of the motor vehicle runs between two prohibition signs situated to the left and to the right of the roadway; determining whether a reflection of the prohibition sign or signs is recorded; determination of a visual flow of the prohibition sign or signs; determination of an angle between the current driving direction and/or of the predicated driving route with a connecting line between the prohibition signs and/or a reference line on a prohibition sign; determining whether the motor vehicle is situated on an oncoming lane; determining whether the prohibition sign or signs have been passed; determining whether after passing the prohibition sign an exit sign directed opposite to the current driving direction is detected; determining whether after passing the prohibition sign a median strip of the road is detected to the right of the current driving direction and/or of the predicated driving route. The method according to the present invention includes at least one, or multiple, of the steps from the aforementioned group.

Advantageous refinements of the present invention are specified in the descriptions herein and described in the description.

Exemplary embodiments of the present invention are explained in greater detail in the following description based on the drawings.

DETAILED DESCRIPTION

Figure 1:
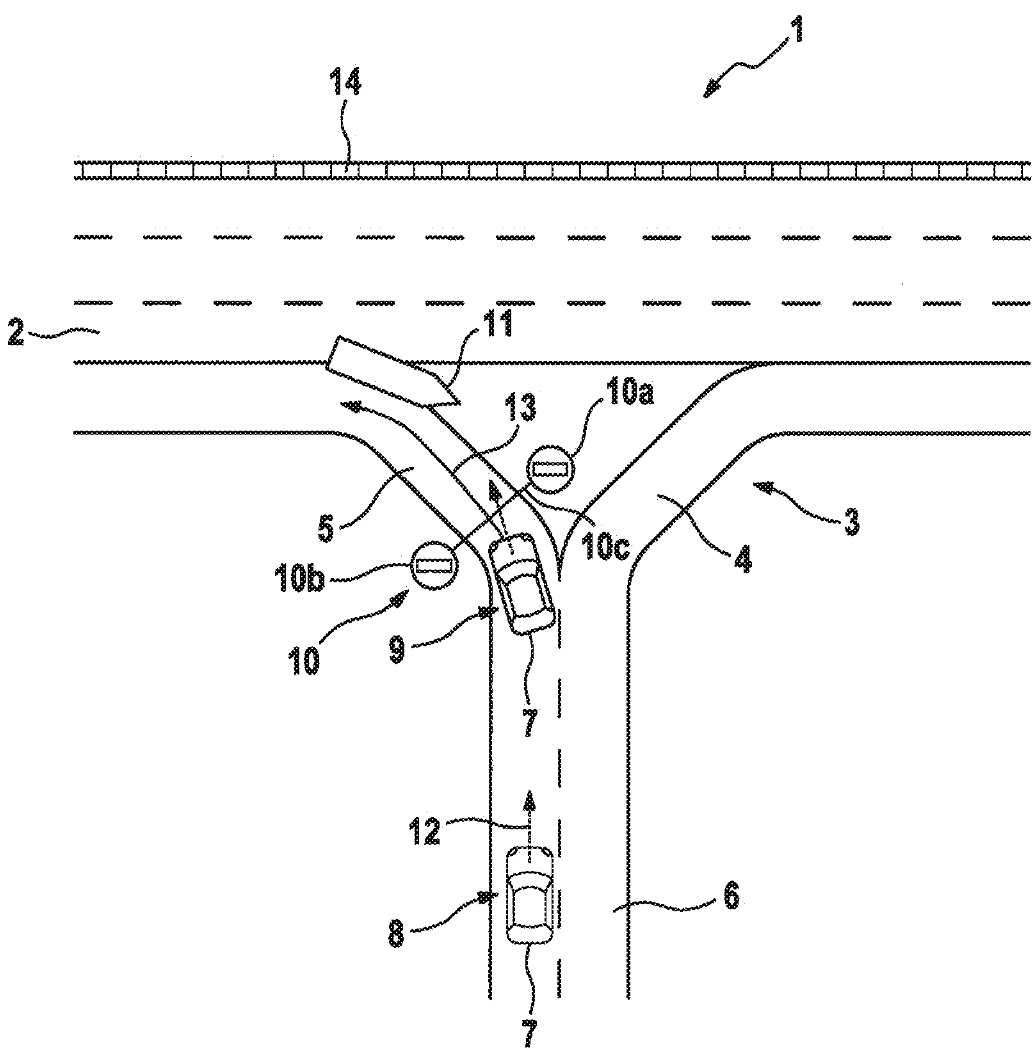
FIG. 1 shows a schematic representation of a junction of a unidirectional roadway.

FIG. 1 shows a road or expressway 1, having two unidirectional roadways 2 structurally separated from one another, as well as a junction 3. Junction 3 has an on-ramp 4 and an off-ramp 5. Starting from a shared roadway 6, on-ramp 4 or access-ramp is used for entering unidirectional roadway 2 of expressway 1, whereas off-ramp 5 or exit-ramp is used to depart unidirectional roadway 2.

A vehicle driving the wrong way or wrong-way driver 7 is depicted in a first position 8 and a second position 9. In first position 8, vehicle 7 is still situated on roadway 6, which may be considered as preparation for a wrong-way driving incident or also already a wrong-way driving incident. In second position 9, vehicle 7 is already in the process of turning into off-ramp 5, which is separated structurally from on-ramp 4.

The term vehicle or motor vehicle is understood here to mean all power-driven arrangement of transportation such as, for example, passenger vehicles, trucks, busses, motorcycles, etc.

A pair of signs 10 having the traffic signs "No entry" according to sign 267 of the Road Traffic Act (StVO) is situated in the area of second position 9. A first prohibition sign 10*a* is situated to the right next to the roadway of off-ramp 5 and a second prohibition sign 10*b* is situated to the left of the roadway of off-ramp 5. The pair of signs is connected to one another by a virtual connecting line 10*c*. Connecting line 10*c* is not applied to roadway 5, but rather is generated and used as part of the plausibility check, for example, in an image processing system, which receives image signals of a video camera of motor vehicle 7. Connecting line 10*c* extends precisely or approximately perpendicularly to roadway 5. From the perspective of wrong-way driver 7, an exit sign 11 in accordance with sign 333 of the Road Traffic Act is situated beyond pair of signs 10.

Starting from its instantaneous position, motor vehicle 7 has a current driving direction or heading 12, as well as a predicated driving route or a predicated driving path 13. The predicated route or trajectory 13 of vehicle 7 is depicted based on the instantaneous position of vehicle 7, as well as other parameters such as, for example, the speed, the steering angle or the acceleration. The term predicated or predicted route or driving route encompasses the distance expected to be covered in the near future. The distance to be covered in the future may be defined, for example, by the detection range of a sensor, a fixed absolute value in meters such as, for example, between 0 and 50 meters, which may be between 0 and 20 meters, or by a value as a function of the speed such as, for example, the braking distance to a complete stop.

A median strip 14 separates two unidirectional roadways of road 1, of which, for the sake of clarity, only one unidirectional roadway 2 is depicted. Median strip 14 may be a concrete wall, guard rails, marking posts, visibility screens and/or vegetation.

Figure 2:
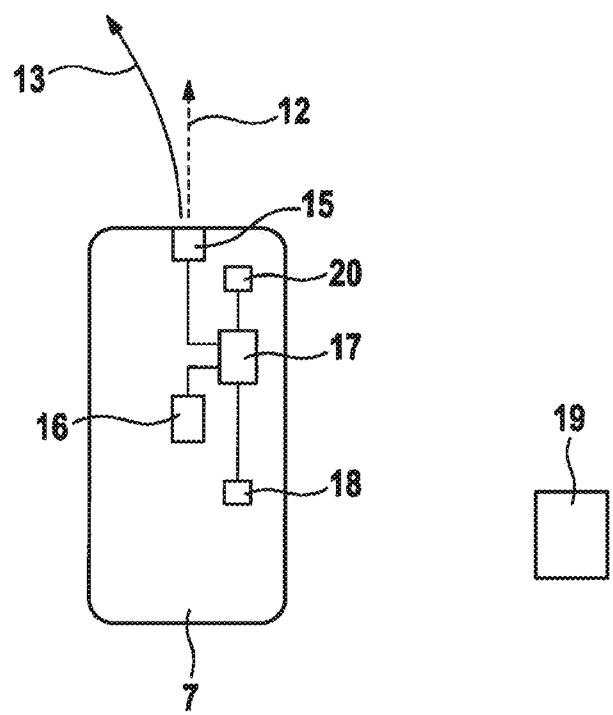
FIG. 2 shows a schematic representation of a motor vehicle including a control and detection unit.

FIG. 2 schematically depicts a motor vehicle 7, which corresponds, for example, to the wrong-way driver from FIG. 1. Accordingly, current driving direction 12 and predicated driving route 13 for motor vehicle 7 are depicted with dotted lines. Motor vehicle 7 includes a control and detection device for a plausibility check of a wrong-way driving incident of motor vehicle 7 at junction 3 of unidirectional roadway 2 of road 1.

Motor vehicle 7 and the control and detection device include at least one sensor 15, which is depicted here for a plurality of sensors by way of example. Sensor 15 may, for example, be an image sensor, a radar sensor, an acceleration sensor, a wheel sensor, a steering angle sensor, a GPS device or the like. Motor vehicle 7 may include a video sensor system as well as other additional sensors.

Motor vehicle 7 and the control and detection device also include a navigation device 16 and a controller 17. Controller 17 is in communication with sensor 15 and navigation device 16, the communication may be by wire or wireless. The controller is also connected to a communication interface 18, which is configured to communicate with an external unit 19, such as a central server. Motor vehicle 7 or the control and detection device also includes a memory 20, which likewise communicates with controller 17. Memory 20 is used, for example, for storing data, such as comparison values or plausibility check values for direction features or direction information, as well as for signs.

Sensor 15, navigation device 16, controller 17, communication interface 18 and memory 20 may—as depicted herein—be configured as independent units, or they may be integrated into one or multiple units. It is, in particular, not necessary for each component to be configured as hardware, likewise individual functions may be implemented as software routines or programs.

With the aid of communication interface 18, it is possible to provide motor vehicle 7 or the control and detection device with information, such as map data, and/or functionalities, such as access to programs of external unit 19.

Figure 3:
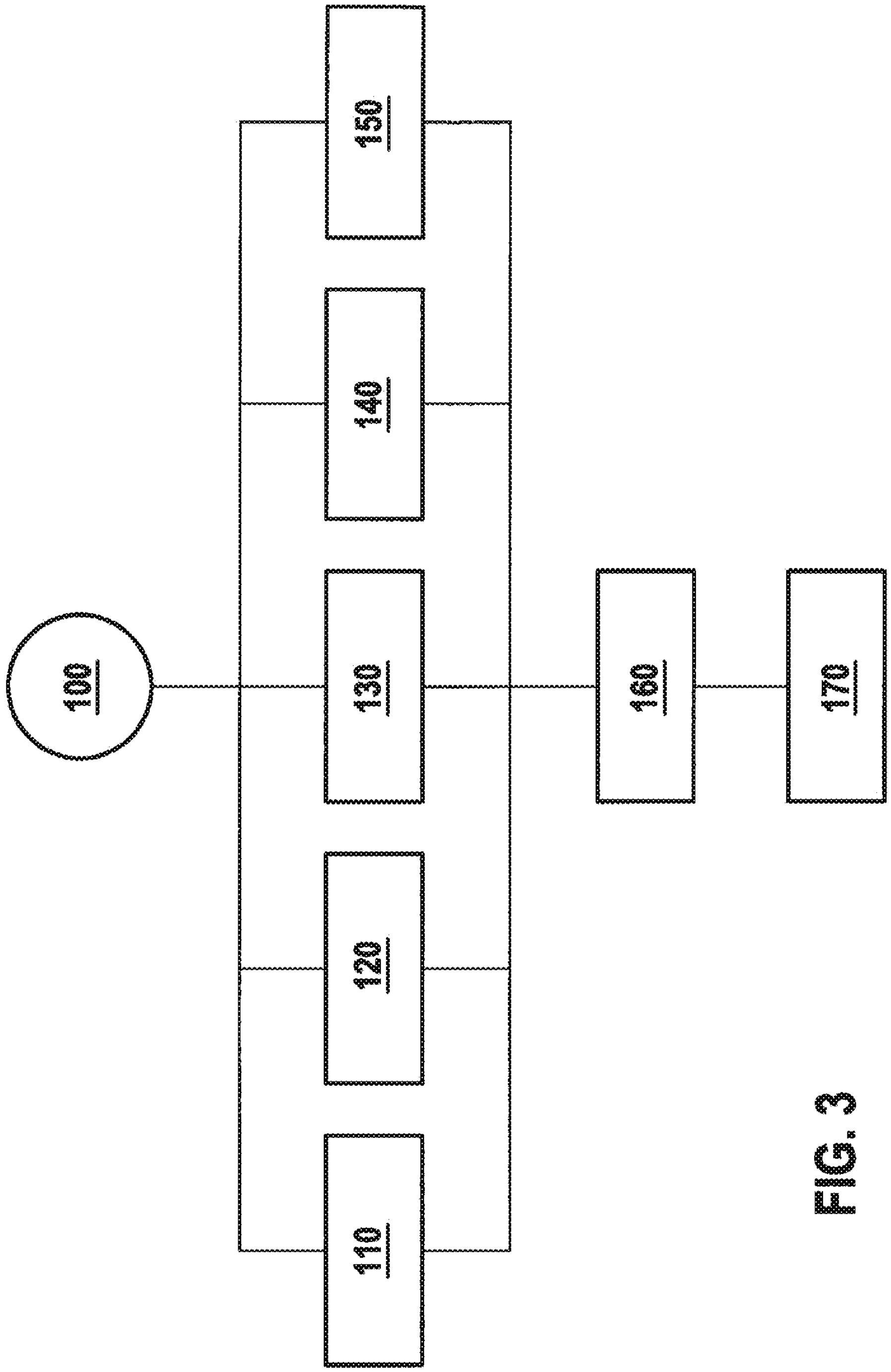
FIG. 3 shows in the form of a flow chart a method for a plausibility check of a wrong-way driving incident of a vehicle.

A method for a plausibility check of a wrong-way driving incident of a motor vehicle 7 or the event chain will now be described based on FIG. 3 in synopsis with FIGS. 1 and 2.

In a first step 100, the method or the additional method steps for plausibility checking are activated. This activation takes place via recognition of a direction feature, such as a "No entry" sign 10*a* of roadway 5 at junction 3. Moreover, for the activation, it may be detected whether motor vehicle 7 is situated on an oncoming lane. This detection whether motor vehicle 7 is situated on an oncoming lane also falls under the recognition of a direction feature.

Multiple determination and recognition steps 110 through 150 are described below, which occur or may be carried out chronologically in parallel and/or in chronological sequence.

The activation of the plausibility check takes place as soon as image sensor 15 of motor vehicle 7 detects prohibition sign 10*a* and/or 10*b*. For this purpose, it is initially unimportant whether motor vehicle 7 is situated in the correct lane of on-ramp 4 or, as depicted in FIG. 1, in wrong lane 5 of the off-ramp. The activation occurs, for example, at position 8 of motor vehicle 7.

In a second step 110, it is determined whether a current driving direction 12 of motor vehicle 7 leads in the direction of a roadway 5 having at least one prohibition sign 10*a* which indicates a no entry into roadway 5. This step of the plausibility check of a wrong-way driving incident considers a first plausibility check criterion and may, for example, be carried out as part of an image processing. If only one prohibition sign 10*a* is present, this image processing may generate an auxiliary line, which intersects roadway 5 perpendicularly or approximately perpendicularly, starting from prohibition sign 10*a*. This auxiliary line, not depicted, corresponds to connecting line 10*c* in FIG. 1. It is subsequently determined whether current driving direction 12 of motor vehicle 7 intersects this auxiliary line.

In the event that two prohibition signs 10*a* and 10*b* are situated on both sides of roadway 5, a connecting line 10*c*, which intersects roadway 5 approximately perpendicularly, is generated between the two prohibition signs 10*a* and 10*b*. Subsequently, it is again checked whether current driving direction 12 of motor vehicle 7 intersects this connecting line 10*c*.

A vehicle 7 is potentially driving the wrong way, if it is determined that the current driving direction or heading 12 of motor vehicle 7 intersects the auxiliary line or connecting line 10*c*. It may then be decided whether an additional plausibility check should first be carried out and/or whether, for example, warnings should already be issued to the driver of motor vehicle 7. The duration for which current driving direction 12 intersects connecting line 10*c* may be used as the additional plausibility check. A potential wrong-way driving incident may be assumed if, for example, an intersection of current driving direction 12 and connecting line 10*c* exists for a few or several seconds such as, for example, for up to 10, which may be 5 seconds. In the case of a determination of an intersection, for example, for merely one second, an evasive maneuver of motor vehicle 7 may be assumed, for example, which does not necessarily result in a wrong-way driving incident.

In the present case, the individual determination steps and plausibility checks are considered in parallel, a wrong-way driving incident being recognized, for example, in the case of a certain number of, for example, two or three, established plausibility check criteria. It may also be provided to apply a value to each plausibility check criterion, which are then added together when a determination is made. Beyond a predefined value, a wrong-way driving incident is then determined.

In a third step 120, a predicated or predicted driving route 13 of motor vehicle 7 is initially calculated or estimated. The predicated driving route or trajectory 13 is ascertained on the basis of information such as, for example, location, speed, steering angle, inertial sensor data and/or GPS data. It is subsequently determined whether this predicated driving route 13 also leads in the direction of a roadway 5 having at least one prohibition sign 10*a*. This determination may be made analogously to step 110. Compared to current driving direction 12, predicated driving route 13 permits a mapping of the movement of motor vehicle 7 which is more precise or directed to the near future. It is possible to carry out only one or both of the two steps 110 and 120.

The wrong-way driving incident may also be checked for plausibility by tracking the visual flow of the prohibition sign or signs 10, 10*b*. In this case, the movement of the object, prohibition sign 10*a* and/or 10*b*, is tracked in the image. This may occur by observing the image coordinates or a motion vector in the image. In this way, a wrong-way driving incident may also be checked for plausibility via the visual flow of the sign during the approach to the pair of signs 10 or to an individual sign 10*a*.

Furthermore, it is possible to track the angle between current driving direction 12 and/or predicated driving route 13 with the aid of connecting line 10*c*, or the auxiliary line. In the situation depicted in FIG. 1, this angle initially does not equal 90 degrees. Upon further approach of motor vehicle 7, for example, from position 8 to position 9, the angle of intersection increasingly approaches 90 degrees. The angle of intersection is 90 degrees immediately before or when motor vehicle 7 passes through pair of signs 10. Using this angle information, it is thus also possible to check the wrong-way driving incident for plausibility.

At this point already, for example, in position 9, when motor vehicle 7 is directly approaching pair of signs 10 and turning around or braking is no longer possible due to the minimal distance, it is possible to detect or determine a wrong-way driving incident. It may then be decided whether additional plausibility checks should still be carried out and/or whether, for example, warnings should already be issued to the driver of motor vehicle 7, or active intervention in the operation of motor vehicle 7 undertaken. This decision may be based on a percentage value assigned to this step.

In another step 130, prohibition sign or signs 10*a*, 10*b* are illuminated with light from motor vehicle 7 and the reflection of prohibition signs 10*a*, 10*b* is used for a plausibility check of a wrong-way driving incident. This optional step may be carried out, for example, during the two steps 110, 120.

In another step 140, which is carried out after passing prohibition sign 10*a* or after crossing connecting line 10*c*, an exit sign 11 directed opposite to the current driving direction of wrong-way driver 7 is detected. As a result, a further plausibility check takes place before motor vehicle 7 enters actual unidirectional roadway 2 by driving the wrong way. Even in the case of a determination or a positive result of this plausibility check criterion, additional plausibility checks may be carried out and/or a wrong-way driving incident may be determined.

In another step 150, which is also carried out after passing prohibition sign 10*a*, 10*b*, a median strip 14 of road 1 is detected to the right of current driving direction 12 and/or of the predicated driving route 13. In this way, it may be determined whether motor vehicle 7 is situated at the end of lane 5 or already on unidirectional roadway 2. Depending on the angle of roadway 5 or motor vehicle 7, median strip 14 may be detected both to the left and to the right of current driving direction 12 or predicated driving route 13. It may then be provided that a wrong-way driving incident is checked for plausibility based on the angle to median strip 14 or based on the size of the image portion of median strip 14 in the left hand or right hand area of the image.

If the plausibility check, i.e. evaluation or review, of the information indicates that it is reliable or that a certain portion thereof is reliable, the wrong-way driving incident may then be detected in a subsequent step 160.

In step 160, a probability of a wrong-way driving incident may initially be ascertained, specifically, based on at least one of detection steps 110, 120, 130, 140 or 150. The processing or calculation of sensor data potentially to be carried out for this purpose may take place either in motor vehicle 7, for example, in controller 17, or in an external unit 19.

In general, the method for a plausibility check of a wrong-way driving incident may be viewed in such a way that for every detection step or plausibility check 110, 120, 130, 140 and 150, a different plausibility check criterion is considered. For each of these plausibility check criteria such as, for example, the determination whether a current driving direction of the motor vehicle leads in the direction of a roadway having at least one prohibition sign, a measured value or sensor value is initially recorded. In this case, these may be a camera image containing prohibition sign 10*a* or previously processed or pre-processed sensor data such as, for example, the recognition of the sign or of the visual flow. This measured value is subsequently compared to a predefined plausibility check value, which may be stored, for example, in memory 20 of motor vehicle 7 or in external unit 19. In the case of a prohibition sign 10*a*, this plausibility check value may include, for example, the dimensions, the shape and/or the content of prohibition sign 10*a*.

Based on this comparison, every plausibility check criterion may then be evaluated. This may occur purely digitally; this means that it assumes the value 1 when a plausibility criterion or a plausibility check criterion is met or violated, whereas otherwise it has the value 0. Alternatively, it may be provided that this evaluation takes place on a percentage basis, for example, as a function of the reliability and/or validity of the sensor data.

In addition, each plausibility check criterion or each detection step 110 through 150 may be assigned a percentage or a probability. Thus, for example, each step 110 through 150 may be assigned a percent value of 20%. It is also possible for individual steps 110 through 150 to be assigned different percent values or percentages. Thus, for example, plausibility criteria ordered consecutively in an event chain may be provided with a higher percentage the further advanced they are in the event chain. Such an event chain may be the determination of the current driving direction, then the determination of the predicated driving route and subsequently the determination of the passing of prohibition sign 10*a*, 10*b*. For example, the first step could be weighted or valued at 10%, the second step at 20% and the third step at 30%.

The probability of a wrong-way driving incident is now ascertained based on the different percentages or percent values. This may occur, for example, by adding together the percentages for all plausibility criteria that are met, which then directly reveals the probability of a wrong-way driving incident. Thus, for example, a percentage of 20% each in the case of three plausibility criteria met indicates a 60% probability of a wrong-way driving incident.

In another step 170, a wrong-way driving incident may now be determined or detected based on the probability. For this purpose, the ascertained probability may be compared with a predefined, also adaptable, limiting value. For example, this limiting value may be 60%, so that beyond or at a probability of 60% a wrong-way driving incident is detected. Responses to the detection may subsequently follow in step 170 or in a further step. These may include passive actions, such as warnings or warning messages to the driver of motor vehicle 7, and also active actions such as, for example, intervening in the movement and/or steering of motor vehicle 7.

What is claimed is:

1. A method for a providing a plausibility check of a wrong-way driving incident of a motor vehicle at a junction of a unidirectional roadway of a road, the method comprising:

activating the plausibility check by recognizing a direction feature of a roadway of the junction, wherein the recognizing includes recognizing at least one road sign as a prohibition sign, wherein the recognizing is performed by at least one image sensor;

determining at least one of (i) whether a current driving direction of the motor vehicle leads in the direction of a roadway having at least one prohibition sign indicating a no entry, and (ii) whether a predicated driving route of the motor vehicle leads in the direction of a roadway having at least one prohibition sign; and intervening in a steering of the motor vehicle based on a result of the determining.

2. The method of claim 1, wherein it is at least one of determined (a) whether the current driving direction of the motor vehicle runs between two prohibition signs situated to the left and to the right of the roadway, and (b) whether the predicated driving route of the motor vehicle runs between prohibition signs situated to the left and to the right of the roadway.

3. The method of claim 2, wherein the determination includes checking whether at least one of the current driving direction and the predicated driving route intersects a connecting line of the two prohibition signs.

4. The method of claim 1, wherein the at least one sensor is used for the determination.

5. The method of claim 1, wherein for the activation, it is detected whether the motor vehicle is situated on an oncoming lane.

6. The method of claim 1, wherein the direction feature of the roadway includes a road sign.

7. The method of claim 1, wherein the at least one prohibition sign is illuminated with light from the motor vehicle and the reflection is used for the determining.

8. The method of claim 1, wherein after passing the at least one prohibition sign an exit sign directed opposite to the current driving direction is detected.

9. The method of claim 1, wherein after passing the at least one prohibition sign a median strip of the road is detected to the right of the current driving direction and/or of the predicated driving route.

10. The method of claim 1, wherein each determination and/or detection includes a plausibility check criterion, and wherein each plausibility check criterion is assigned a percentage for ascertaining the probability of a wrong-way driving incident.

11. The method of claim 1, wherein the at least one sensor, which includes a video camera of the motor vehicle, is used for the determination.

12. A control and detection device for providing a plausibility check of a wrong-way driving incident of a motor vehicle at a junction of a unidirectional roadway of a road, comprising:

an activating arrangement to activate the plausibility check, configured for recognizing a direction feature of a roadway of the junction, wherein the recognizing includes recognizing at least one road sign as a prohibition sign, wherein the recognizing is performed by an image sensor;

a determining arrangement to determine at least one of (i) whether a current driving direction of the motor vehicle leads in the direction of a roadway having at least one prohibition sign indicating a no entry, and (ii) whether a predicated driving route of the motor vehicle leads in the direction of a roadway having at least one prohibition sign; and an arrangement for intervening in a steering of the motor vehicle based on a result of the determining arrangement.

* * * * *